US010780577B2

United States Patent
Murakami et al.

(10) Patent No.: US 10,780,577 B2
(45) Date of Patent: Sep. 22, 2020

(54) MACHINE LEARNING DEVICE, ROBOT SYSTEM, AND MACHINE LEARNING METHOD FOR LEARNING OPERATIONS OF ROBOT AND LASER SCANNER

(71) Applicant: FANUC CORPORATION, Yamanashi (JP)

(72) Inventors: Yoshinori Murakami, Yamanashi (JP); Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 16 days.

(21) Appl. No.: 15/831,777

(22) Filed: Dec. 5, 2017

(65) Prior Publication Data
US 2018/0169856 A1 Jun. 21, 2018

(30) Foreign Application Priority Data
Dec. 16, 2016 (JP) ................ 2016-244714

(51) Int. Cl.
*B25J 9/16* (2006.01)
*G06N 3/00* (2006.01)
*G06N 3/08* (2006.01)

(52) U.S. Cl.
CPC .............. *B25J 9/161* (2013.01); *B25J 9/163* (2013.01); *G06N 3/008* (2013.01); *G06N 3/08* (2013.01);
(Continued)

(58) Field of Classification Search
CPC . B25J 9/161; B25J 9/163; G05B 2219/45104; G06N 3/008; G06N 3/08; G06N 3/084
See application file for complete search history.

(56) References Cited

U.S. PATENT DOCUMENTS 8,947,522 B1    2/2015  Hickman et al.
2004/0111185 A1* 6/2004  Gmeiner ............ B23K 26/0884
                                                700/245
(Continued)

FOREIGN PATENT DOCUMENTS

CN    102819264 A    12/2012
CN    105537821 A    5/2016
(Continued)

OTHER PUBLICATIONS

Shelton, Balancing Multiple Sources of Reward in Reinforcement Learning, Artificial Intelligence Lab Massachusetts Institute of Technology (Year: 2006).*
(Continued)

*Primary Examiner* — Ryan Rink
(74) *Attorney, Agent, or Firm* — Hauptman Ham LLP

(57) ABSTRACT

A machine learning device for learning operations of a robot and a laser scanner, includes a state observation unit observing a state of a tip end of the robot where the laser scanner is mounted and a state of an optical component in the laser scanner as a state data; a determination data obtaining unit receiving at least one of a machining time of the robot where the laser scanner is mounted, a drive current driving the robot, a command path of the laser scanner, a passing time in a processable area where the laser scanner performs processing, and a distance between the robot and a part where the laser scanner performs processing as a determination data; and a learning unit learning operations of the robot and the laser scanner based on an output of the state observation unit and an output of the determination data obtaining unit.

13 Claims, 12 Drawing Sheets

(52) U.S. Cl.
CPC ... *G06N 3/084* (2013.01); *G05B 2219/45104* (2013.01)

(56) References Cited

U.S. PATENT DOCUMENTS

| | | | |
|---|---|---|---|
| 2006/0060573 A1 | 3/2006 | Becker et al. | |
| 2006/0212170 A1* | 9/2006 | Nagatsuka | B23K 26/0884 700/245 |
| 2007/0075055 A1 | 4/2007 | Komatsu | |
| 2007/0278426 A1* | 12/2007 | Tanaka | B23K 26/0884 250/492.3 |
| 2008/0161964 A1 | 7/2008 | Irie et al. | |
| 2009/0145888 A1 | 6/2009 | Hesse et al. | |
| 2009/0184676 A1* | 7/2009 | Schoerg | G05B 19/23 318/640 |
| 2010/0174407 A1* | 7/2010 | Fukawa | B23K 26/04 700/245 |
| 2010/0184011 A1* | 7/2010 | Comerford | G10L 15/26 434/321 |
| 2012/0296471 A1* | 11/2012 | Inaba | B25J 9/163 700/253 |
| 2015/0306768 A1* | 10/2015 | Liang | G06F 17/5009 703/2 |
| 2016/0008976 A1* | 1/2016 | Nagatsuka | B25J 9/163 700/253 |
| 2016/0075018 A1* | 3/2016 | Izhikevich | B25J 9/163 700/253 |
| 2016/0288323 A1* | 10/2016 | Muhlig | B25J 9/1656 |
| 2016/0357525 A1 | 12/2016 | Wee et al. | |
| 2017/0032281 A1* | 2/2017 | Hsu | B23K 9/0953 |
| 2017/0113300 A1* | 4/2017 | Ludi | B23K 26/032 |
| 2017/0160706 A1* | 6/2017 | Dull | G05B 13/042 |
| 2017/0220927 A1* | 8/2017 | Takigawa | B23K 26/032 |
| 2017/0243135 A1* | 8/2017 | Ooba | G05B 19/4185 |
| 2018/0079076 A1* | 3/2018 | Toda | B25J 9/1664 |
| 2018/0181108 A1* | 6/2018 | Nagano | G05B 19/4083 |
| 2018/0361514 A1* | 12/2018 | Narayanan | B23K 31/125 |

FOREIGN PATENT DOCUMENTS

| | | |
|---|---|---|
| CN | 105798923 A | 7/2016 |
| DE | 102005039582 A1 | 3/2006 |
| JP | H10-143218 A | 5/1998 |
| JP | 2004-174709 A | 6/2004 |
| JP | 2006-187803 A | 7/2006 |
| JP | 2006-247677 A | 9/2006 |
| JP | 2007-98464 A | 4/2007 |
| JP | 2007-313561 A | 12/2007 |
| JP | 2011-65553 A | 3/2011 |
| JP | 4792901 B2 | 10/2011 |
| JP | 4922584 B2 | 4/2012 |
| JP | 2012-157965 A | 8/2012 |
| JP | 2015-208811 A | 11/2015 |
| JP | 2016-147269 A | 8/2016 |
| JP | 2016-177442 A | 10/2016 |

OTHER PUBLICATIONS

Karlsson, Learning to Solve Multiple Goals, University of Rochester (Year: 1997).*

* cited by examiner

MACHINE LEARNING DEVICE, ROBOT SYSTEM, AND MACHINE LEARNING METHOD FOR LEARNING OPERATIONS OF ROBOT AND LASER SCANNER

RELATED APPLICATIONS

The present application claims priority to Japanese Patent Application No. 2016-244714 filed Dec. 16, 2016, the disclosure of which is hereby incorporated by reference herein in its entirety.

BACKGROUND OF THE INVENTION

1. Field of the Invention

The present invention relates to a machine learning device, a robot system, and a machine learning method for learning operations of a robot and a laser scanner.

2. Description of the Related Art

In recent years, for example, to weld a vehicle body of an automotive, a remote laser welding robot (a robot system) which performs laser welding using a laser scanner mounted on a tip end (a hand portion) of the robot has been receiving attention and been put into practice. Herein, the laser scanner is a laser optical system and a device for scanning a laser beam by operating at least one mirror (e.g., two mirrors in an XY direction: optical components) or an optical component, such as a lens or a glass plate. Among these, a device which is a laser optical system and scans a laser beam by operating at least one mirror (e.g., two mirrors in the XY direction) is generally referred to as a galvanometer scanner. Note that in the present specification, mainly, a galvanometer scanner which is an example of a laser scanner will be described, but the present invention is applied to a galvanometer scanner in a non-limitative manner and may be widely applied to a laser scanner in general, such as a trepanning head and a polygon scanner.

Incidentally, hitherto, for example, Japanese Patent No. 4922584 discloses a robot system which is mounted with a tool provided with a drive axis and performs machining using laser in which a robot moves along a taught path and the drive axis of the tool is controlled so as to move a laser beam over a machining path desired by a manipulator. Such a robot system includes a robot axis arithmetic unit which calculates a position and posture of a control point of the robot that is set on the tool and a tool axis arithmetic unit which determines an operation command to be transmitted to the drive axis of the tool by calculation from the position and posture of the control point of the robot as calculated by the robot axis arithmetic unit and a focal position of the laser beam as set in advance.

Further, hitherto, for example, Japanese Patent No. 4792901 discloses a laser welding device capable of accurately radiating a laser beam onto a predetermined laser irradiation position. Such a laser welding device includes a robot, a laser beam emission section which is mounted on the robot and emits (radiates) a laser beam, a measurement section which measures a current position of the robot, and a control section which controls a direction of a laser beam emitted from a laser emission section based on the current position of the robot as measured such that a laser irradiation position corresponds to a predetermined irradiation position.

As described above, hitherto, the robot system in which the robot moves along a taught path and the drive axis of the tool is controlled so as to move a laser beam over a machining path desired by a manipulator and the laser welding device capable of accurately radiating a laser beam onto a predetermined laser irradiation position have been proposed. However, such robot system and laser welding device are not to optimize operations of the robot and the tool (the laser emission section) based on features of the robot and features of the tool (the laser emission section).

Further, as described above, in recent years, the remote laser welding robot system which performs laser welding using the galvanometer scanner (a laser scanner) mounted on the tip end of the robot has been put into practice. In the operation of the galvanometer scanner, for example, a laser beam as radiating may be scanned highly accurately at a high speed, whereas an area (a range) in which a laser beam may be scanned is not so large. In contrast, in the operation of the robot (the tip end of the robot), an accuracy and a speed is inferior as compared to scanning of a laser beam by the galvanometer scanner, whereas an area in which movement is possible is sufficiently large.

Then, in the remote laser welding robot system, when a machining path (a command path) of welding is set, for example, it may be configured that a person (an operator or a user) takes features of the operations of the robot and the galvanometer scanner into consideration to optimize the operations of the robot and the galvanometer scanner. However, performing such optimization of the operations of the robot and the galvanometer scanner (teaching of the operation or creation of a program) by a person is difficult.

Note that in the present specification, a remote laser welding robot system which performs welding by scanning a laser beam in two dimensions (2D) in an XY direction will be described by way of example, but the robot system of the present invention may be applied not only to a robot system which performs laser welding but also, for example, to those which perform various operations, such as laser cutting, laser hole piercing, metal machining, laser resin welding, resin machining, surface machining, and surface modification. In addition, the galvanometer scanner is not limited to that which scans a laser beam in two dimensions in the XY direction, but, for example, may be that which scans in three dimensions (3D) in which a Z direction by a focus control mechanism is added, and further, a type of a laser beam used may be, to begin with, fiber laser, and carbon dioxide ($CO_2$) laser, Yttrium Aluminum Garnet (YAG) laser, and the like.

In view of the problem of the prior art as described above, an object of the present invention is to provide a machine learning device, a robot system, and a machine learning method capable of optimizing operations of a robot and a laser scanner.

SUMMARY OF INVENTION

According to a first aspect of the present invention, there is provided a machine learning device for learning operations of a robot and a laser scanner, including a state observation unit which observes a state of a tip end of the robot to which the laser scanner is mounted and a state of an optical component in the laser scanner as a state data; a determination data obtaining unit which receives at least one of a machining time of the robot to which the laser scanner is mounted, a drive current which drives the robot, a command path of the laser scanner, a passing time in a processable area in which the laser scanner performs processing, and a distance between the robot and a part at which the laser scanner performs processing as a determination data; and a learning unit which learns operations of the robot and the laser scanner based on an output of the state observation unit and an output of the determination data obtaining unit.

The state observation unit may observe a position, a speed, and an acceleration of the tip end of the robot to which the laser scanner is mounted. The state observation unit may observe a position, a speed, and an acceleration of the optical component in the laser scanner. The machine learning device may further include a decision unit which determines an action output to the robot and the laser scanner based on the operations of the robot and the laser scanner as learned by the learning unit.

The learning unit may include a reward calculation unit which calculates a reward based on an output of the state observation unit and an output of the determination data obtaining unit; and a value function update unit which updates a value function that determines a value of the operations of the robot and the laser scanner based on the output of the state observation unit, the output of the determination data obtaining unit, and an output of the reward calculation unit. The reward calculation unit may set a negative reward when the machining time of the robot is long, and set a positive reward when the machining time of the robot is short. The reward calculation unit may set a negative reward when the command path of the laser scanner is short, and set a positive reward when the command path of the laser scanner is long; or may set a negative reward when the drive current which drives the robot is large, and set a positive reward when the drive current which drives the robot is small. The reward calculation unit may set a negative reward when the passing time in the processable area in which the laser scanner performs processing is short, and set a positive reward when the passing time in the processable area in which the laser scanner performs processing is long; or may set a negative reward when the distance between the robot and the part at which the laser scanner performs processing is long, and set a positive reward when the distance between the robot and the part at which the laser scanner performs processing is short.

The machine learning device may include a neural network. The machine learning device may be provided to each robot, configured to be connectable to at least one other machine learning device, and may mutually exchange or share a result of machine learning with the at least one other machine learning device. The machine learning device may be located in a cloud server or a fog server.

According to a second aspect of the present invention, there is provided a robot system including a robot controller, the robot which is controlled by the robot controller, a laser scanner controller, the laser scanner which is controlled by the laser scanner controller, and the machine learning device according to the above described first aspect. The robot may be a remote laser welding robot which performs welding using a laser beam radiated from the laser scanner.

According to a third aspect of the present invention, there is provided a machine learning method for learning operations of a robot and a laser scanner, including observing a state of a tip end of the robot to which the laser scanner is mounted and a state of an optical component in the laser scanner as a state data; receiving at least one of a machining time of the robot to which the laser scanner is mounted, a drive current which drives the robot, a command path of the laser scanner, a passing time in a processable area in which the laser scanner performs processing, and a distance between the robot and a part at which the laser scanner performs processing as a determination data; and learning operations of the robot and the laser scanner based on the state data as observed and the determination data as obtained. The learning the operations of the robot and the laser scanner may include calculating a reward based on the state data as observed and the determination data as obtained, and updating a value function which determines a value of the operations of the robot and the laser scanner based on the state data as observed, the determination data as obtained, and the reward as calculated.

BRIEF DESCRIPTION OF THE DRAWINGS

The present invention will be understood more clearly by referring to the following accompanying drawings.

DETAILED DESCRIPTION

Figure 11:
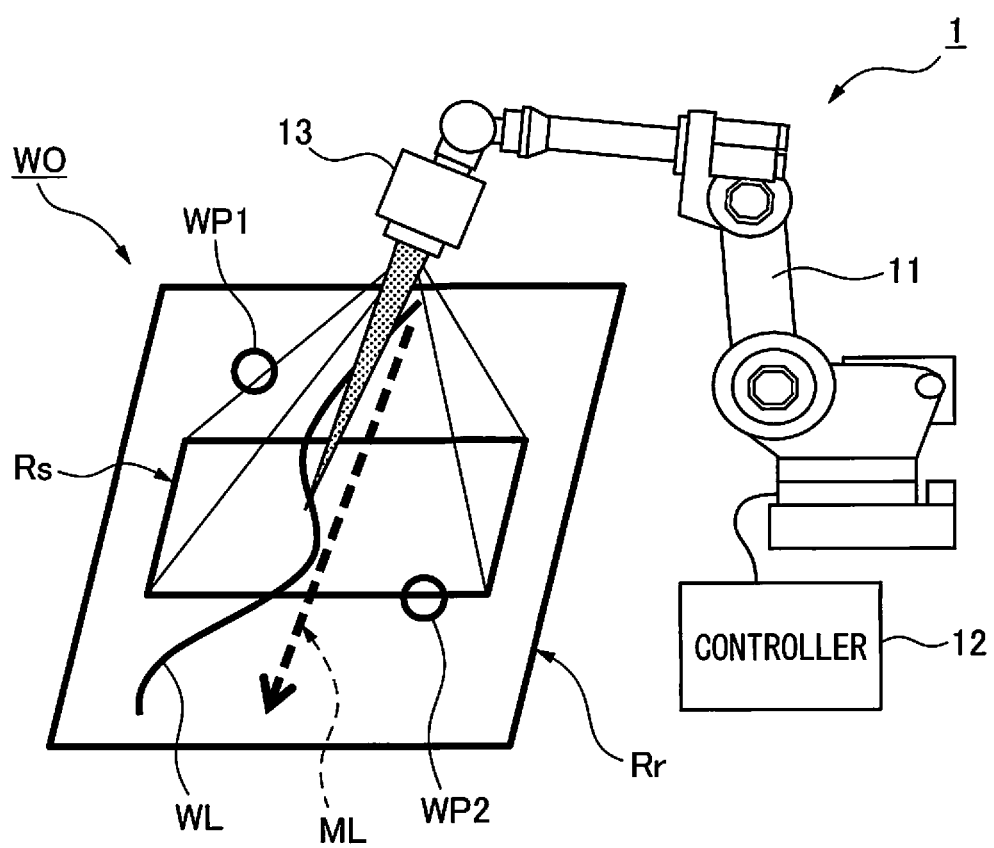
FIG. 11 is a diagram schematically illustrating an example of the robot system.

First, an example of a robot system and problems thereof will be described with reference to FIG. 11 to FIG. 13B before a machine learning device, a robot system, and a machine learning method of the present invention will be described in detail. FIG. 11 is a diagram schematically illustrating an example of the robot system. Note that in the following description, a galvanometer scanner will be described by way of example, but the present invention is applied to a galvanometer scanner in a non-limitative manner and, needless to say, may be widely applied to a laser scanner in general, such as a trepanning head and a polygon scanner.

As illustrated in FIG. 11, a robot system (remote laser welding robot system) 1 is to perform laser welding WL, WP1, WP2 on a welding object WO and includes, for example, a robot 11, a controller (a robot controller) 12 which controls the robot 11, and a galvanometer scanner (a laser scanner) 13 mounted on a tip end (a hand portion) of the robot 11. Herein, it is configured that a galvanometer scanner controller (a laser scanner controller) which controls the galvanometer scanner 13 is incorporated in the controller 12.

The welding object WO is, for example, a vehicle body of an automotive, and in the vehicle body WO of the automotive, for example, on welding points WP1, WP2 and a predetermined welding line (a machining path) WL distantly positioned, operations of the robot 11 and the galvanometer scanner 13 is controlled to perform laser welding. Herein, the galvanometer scanner 13 includes, for example, two mirrors (optical components) in an X-axis direction and a Y-axis direction orthogonal to each other and the two mirrors are controlled, whereby a laser beam radiated from the galvanometer scanner 13 may be scanned in a range of an area Rs. Further, the tip end of the robot 11 may move, for example, in a range of an area Rr.

Note that the galvanometer scanner 13, for example, scans a laser beam by changing an angle of the mirrors in the X and Y directions so that a laser beam radiated from the galvanometer scanner 13 may be scanned highly accurately at a high speed. Note that since the area Rs in which the galvanometer scanner 13 may scan a laser beam is not so large, for example, to radiate a laser beam onto the welding points WP1, WP2 and the welding line WL, the robot 11 is operated. Further, since the robot 11 (the tip end of the robot) operates (moves) by servo controlling a motor which drives each axis of the robot, a movement accuracy and a movement speed are inferior as compared to scanning of a laser beam by the galvanometer scanner 13, while the are Rr in which movement is possible is sufficiently large so that a laser beam may be radiated over the entirety of the welding points WP1, WP2 and the welding line WL.

FIG. 12A, FIG. 12B, FIG. 13A and FIG. 13B are diagrams for illustrating a machining path of the galvanometer scanner in the robot system. FIG. 12A, FIG. 12B, FIG. 13A and FIG. 13B illustrate that the welding target (a workpiece to be welded) WO is a vehicle body of an automotive and welding is performed on the welding points (e.g., spot welding points) WP11 to WP16 of the vehicle body WO of an automotive. Herein, in general, when the workpiece to be welded (WO) is welded, welding positions (WP11 to WP16) of the workpiece are determined at a design stage.

Figure 12A:
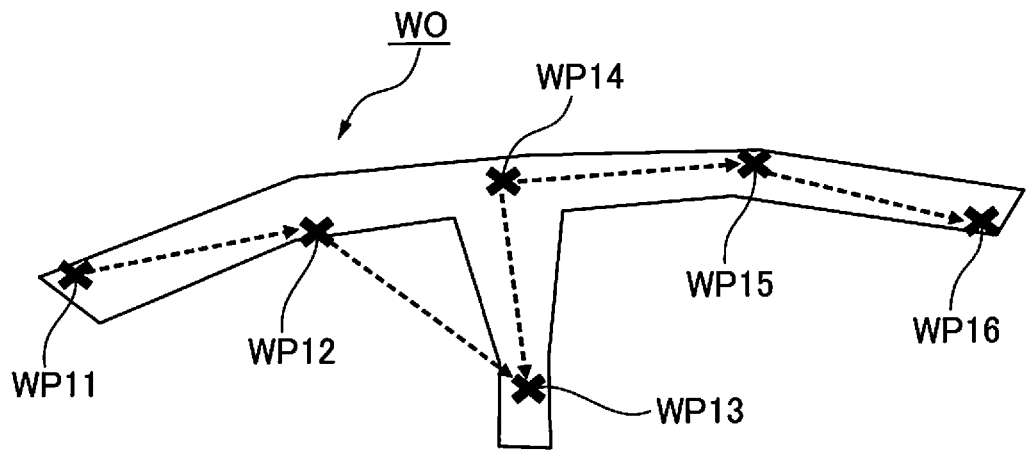
FIG. 12A and FIG. 12B are diagrams (No. 1) for illustrating a machining path of a galvanometer scanner in the robot system.

As illustrated in FIG. 12A, for example, in an operation by a spot welding robot or an arc welding robot which performs welding at a fixed position on a welding tool (a spot gun and a welding torch) mounted on the tip end of the robot (11), for example, the operation of the robot is controlled, for example, such that a welding tool tip end is positioned relative to or passes the welding positions WP11 to WP16. Accordingly, a movement path of the tip end of such a spot welding robot or arc welding robot is, so as to speak, unicursal relative to the welding positions WP11 to WP16.

Figure 12B:
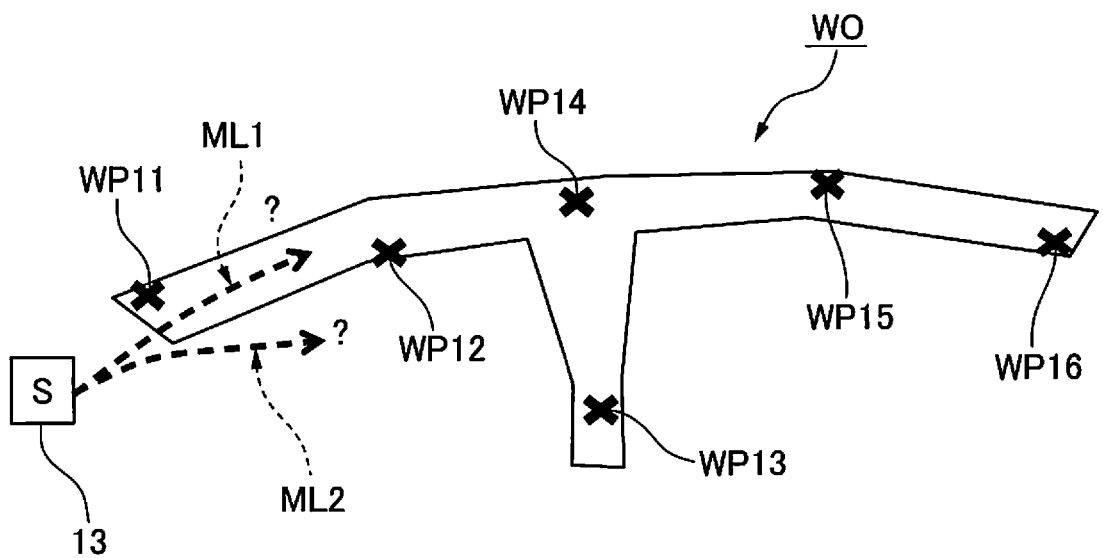

In contrast, as illustrated in FIG. 12B, in the remote laser welding robot system 1 using the galvanometer scanner 13, welding may be performed on the welding positions WP11 to WP16 which are positions changeable relative to the tip end of the robot 11. Accordingly, as a movement path of the tip end (the galvanometer scanner 13) of the robot 11, a plurality of paths, such as movement paths ML1, ML2 from a welding start point S, may be designed. In other words, in the remote laser welding robot system using the galvanometer scanner, the welding positions (WP11 to WP16) may be positions changeable relative to the welding tool (the galvanometer scanner 13) so that a movement path of the tip end of the remote welding robot is not to be unicursal relative to the welding positions WP11-WP16, which provides a high degree of freedom. However, due to the high degree of freedom, an optimal path of the robot is to be found through trial and error, which is a difficult operation.

Figure 13A:
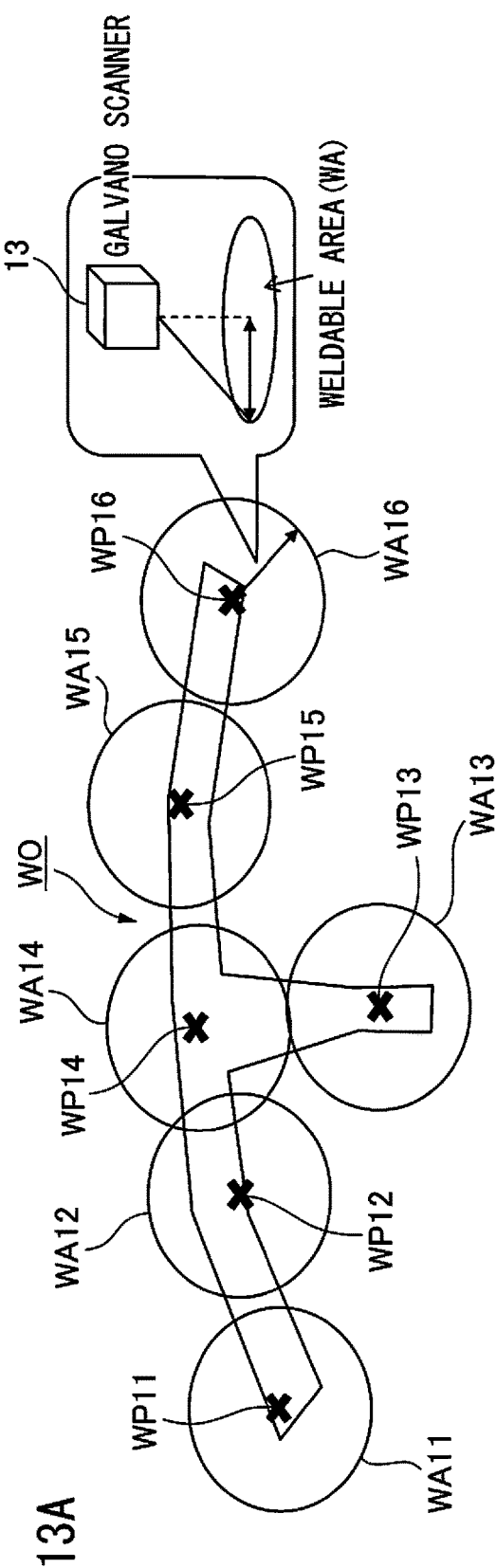
FIG. 13A and FIG. 13B are diagrams (No. 2) for illustrating the machining path of the galvanometer scanner in the robot system.
Figure 13B:
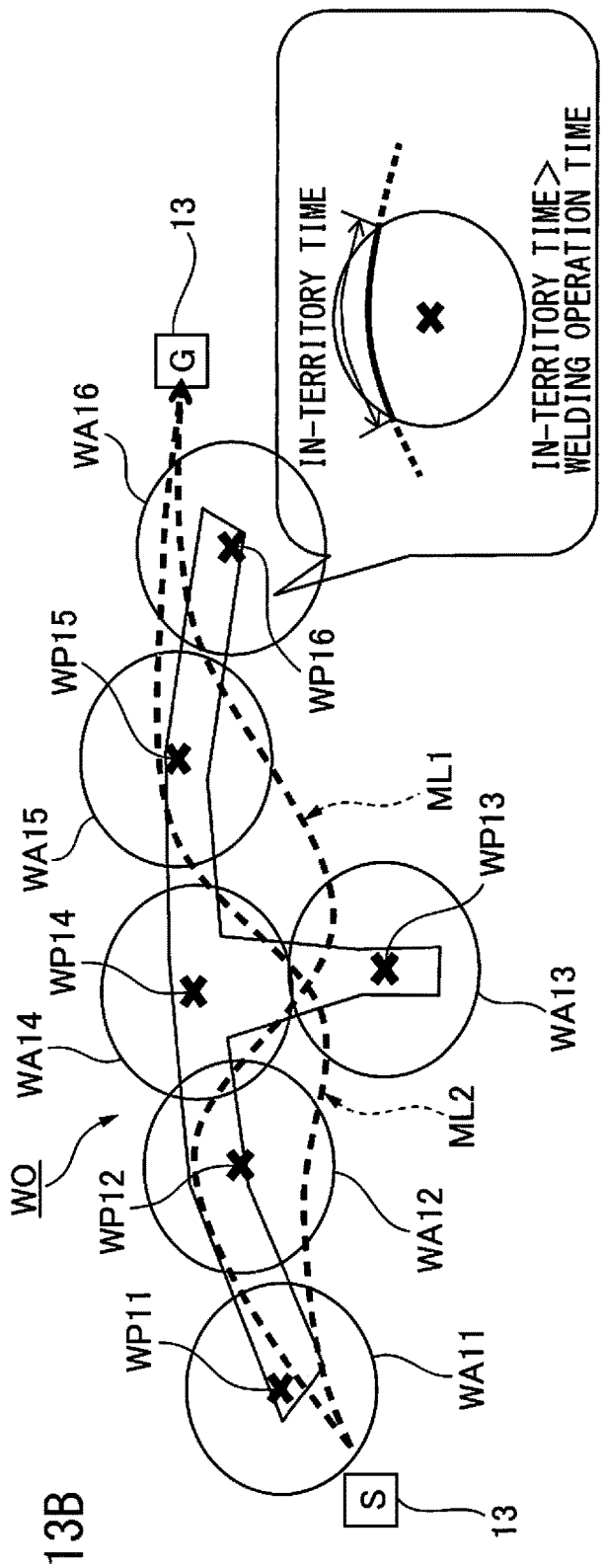

In FIG. 13A and FIG. 13B, reference signs WA (WA11 to WA16) indicate areas (weldable areas) in which welding may be performed on the respective welding positions WP11 to WP16. Thus, to weld the welding positions WP11 to WP16, the galvanometer scanner 13 (the tip end of the robot 11) is to pass the weldable areas WA11 to WA16. The weldable areas WA11 to WA16 correspond to irradiation areas of the scanner (a laser beam) relative to the welding positions WP11 to WP16, respectively.

As illustrated in FIG. 13B, for example, when the galvanometer scanner 13 reaches from the welding start point S via the weldable areas WA11 to WA16 (welding positions WP11 to WP16) to a welding end point G, for example, a plurality of paths, such as the movement paths ML1, ML2 are possible, while, in passing each of the weldable areas WA11 to WA16, a passing time (an in-territory time) is to be greater than or equal to a welding operation time (e.g., a time for welding, air cut, and jumping from a preceding or following welding operation) for performing predetermined welding by the galvanometer scanner 13 (the in-territory time>the welding operation time).

Thus, in the remote laser welding robot system (robot system) 1, when a machining path (a command path) in which laser welding is performed is set, for example, it is configured that a person (an operator or a user) takes features of the operations of the robot 11 and the galvanometer scanner 13 into consideration to optimize the operations of the robot 11 and the galvanometer scanner 13. However, as described above, because the operations of the robot 11 and the galvanometer scanner 13 each has different features, performing such optimization of the operations of the robot 11 and the galvanometer scanner 13 by a person is difficult, and usually, for example, it is configured that, similarly to a broken line ML in FIG. 11, the tip end of the robot 11 is linearly moved, and on the way of such linear movement line ML, the galvanometer scanner 13 is controlled to radiate a laser beam onto the predetermined positions (WP1, WP2, WL).

Hereinafter, embodiments of the machine learning device, the robot system, and the machine learning method of the present invention will be described in detail with reference to the accompanying drawings. First, in the machine learning device, the robot system, and the machine learning method according to the present embodiment, the operation (a trajectory and a movement speed) of the robot is favorably optimized under conditions as described below.

A welding position is fixed.

A path of the robot falls within a movable area of the robot.

A movement speed of the robot is less than or equal to a maximum speed of the robot.

An acceleration and a deceleration of the robot as moving is lower than or equal to an acceleration and a deceleration capacity of the robot.

The robot passes a weldable area relative to the welding position which corresponds to an irradiation area of a scanner.

A time in which the robot passes the weldable area is greater than or equal to the welding operation time of the scanner.

Further, in the machine learning device, the robot system, and the machine learning method according to the present embodiment, the operations of the robot and the galvanometer scanner (the laser scanner) are machine-learned based on the above conditions to aim at optimizing the operation of the robot. Note that achievement rewards of machine learning according to the present embodiment may include, for example, the following.

- It is appropriate that a time in which the robot moves over the path is shorter (productivity).
- It is appropriate that an acceleration and a deceleration of the robot is lower (no shaking allows a robot life to be extended).
- It is appropriate that the time in which the robot passes the weldable area is greater (an adjustment margin of machining conditions may be secured).
- It is appropriate that the robot (the galvanometer scanner) is nearer the welding position (a light-gathering error of a lens is smaller).
- Various types of achievement rewards are weighted so that the operation is optimized as desired by the user, such as the operation emphasizing the productivity.

Figure 1:
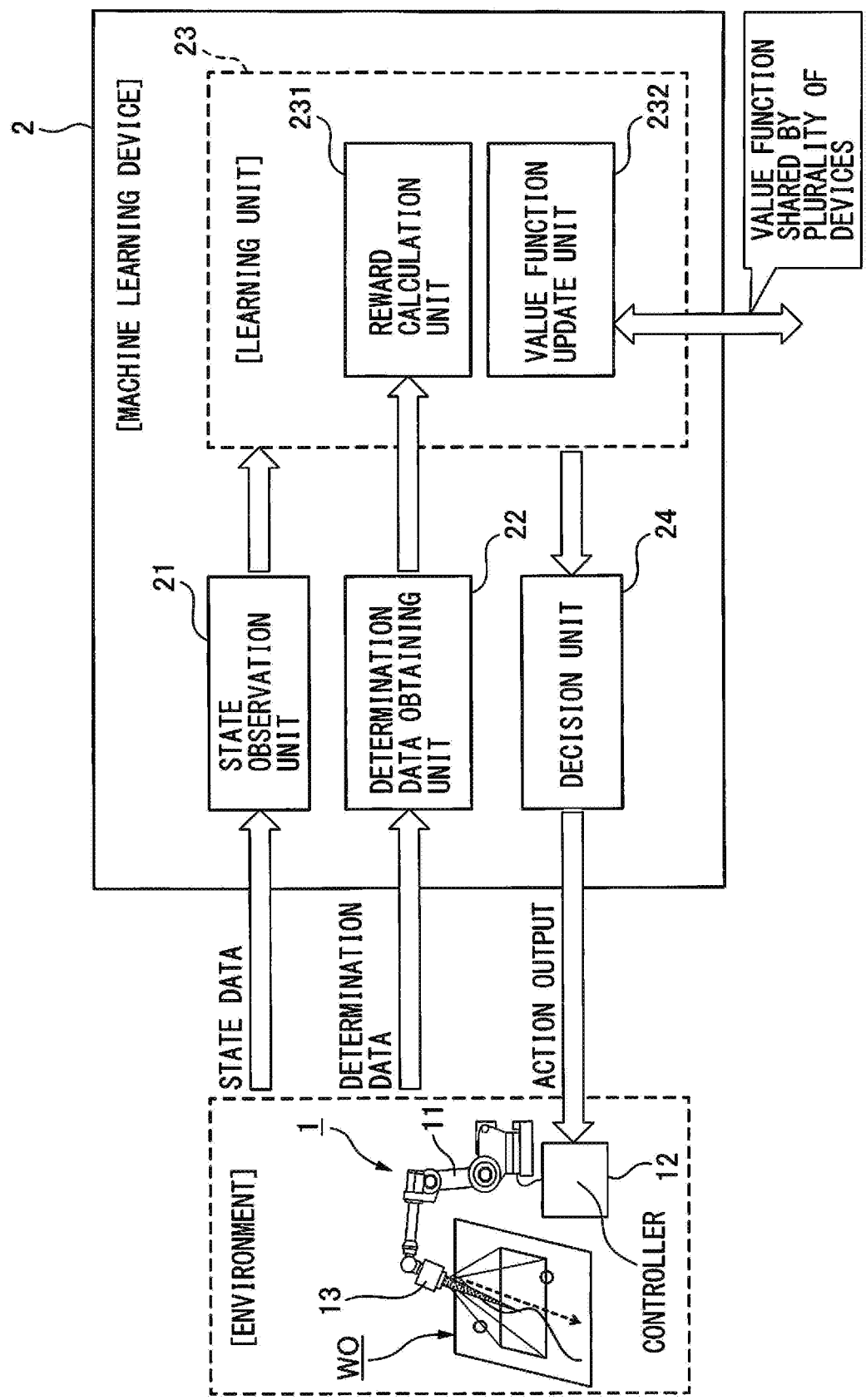
FIG. 1 is a block diagram schematically illustrating an embodiment of a robot system and a machine learning device of the present invention.
Figure 2:
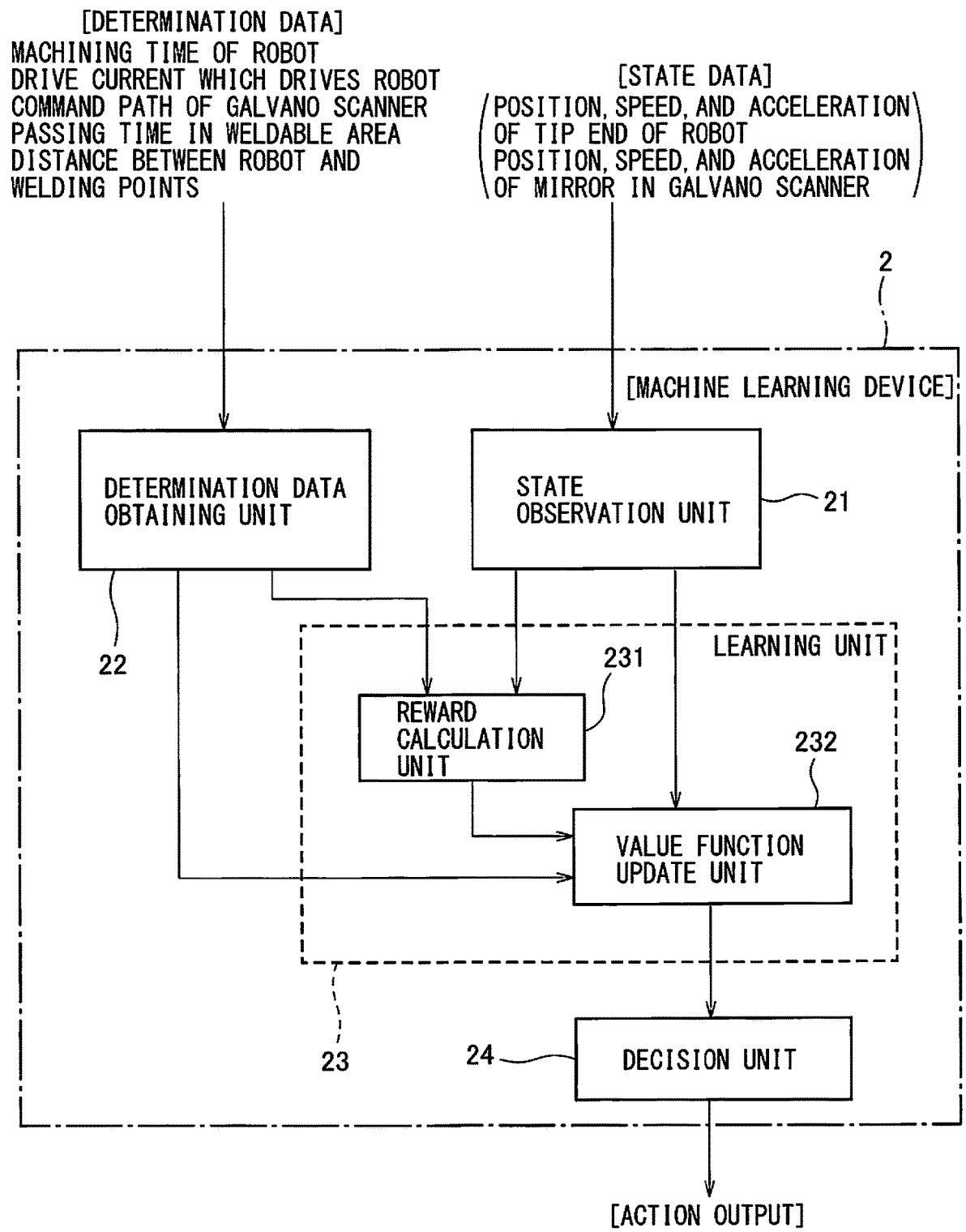
FIG. 2 is a block diagram schematically illustrating the embodiment of the machine learning device of the present invention.

FIG. 1 is a block diagram schematically illustrating an embodiment of the robot system and the machine learning device of the present invention and FIG. 2 is a block diagram schematically illustrating an example of the machine learning device of the present invention. As illustrated in FIG. 1, the robot system (the remote laser welding robot system) 1 according to the present embodiment which corresponds to the robot system as described with reference to FIG. 11 operates to output to a machine learning device 2 determination data and state data (a state variable) and receive an action output (a learned command value, a manipulated variable) of the operations of the robot and the galvanometer scanner (the laser scanner) as learned by the machine learning device 2. Note that the machine learning device 2 may be provided, for example, to a robot controller 12 which controls the operation of the robot 11. Further, as described above, the robot controller 12 may be provided with the galvanometer scanner controller which controls the galvanometer scanner 13.

As illustrated in FIG. 1, the machine learning device 2 includes a state observation unit 21, a determination data obtaining unit 22, a learning unit 23, and a decision unit 24, and the learning unit 23 includes a reward calculation unit 231 and a value function update unit 232. The state observation unit 21 receives status data from the robot system 1 and the determination data obtaining unit 22 receives the determination data from the robot system 1. An output of the state observation unit 21 and the determination data obtaining unit 22 is input to the learning unit 23 and an output of the learning unit 23 is input via the decision unit 24 as the action output for controlling the operation of the robot system 1 (the robot 11 and the galvanometer scanner 13) to the robot system 1 (the controller 12).

Herein, the machine learning device 2 is provided, for example, to each robot 11 (the robot system 1) and configured to be connectable to at least one other machine learning device (2), and may mutually exchange or share with the at least one other machine learning device a result of machine learning. Alternatively, the machine learning device 2 may be located in a cloud server or a fog server and configured to exchange data (the state data, the determination data, and the action output) with each robot 11 (the robot system 1) via a network.

As illustrated in FIG. 2, in the machine learning device 2, the state data received by the state observation unit 21 includes, for example, a position, a speed, and an acceleration of the tip end of the robot 11 and a position (a mirror angle), a speed, and an acceleration of the galvanometer scanner 13 (a mirror (an optical component)) and the determination data received by the determination data obtaining unit 22 includes, for example, a machining time of the robot 11 (the robot system 1), a drive current which drives the robot 11, a command path of the galvanometer scanner 13, a passing time in a processable area in which the galvanometer scanner 13 performs processing (the in-territory time in the weldable area WA (WA11 to WA16)), and a distance between the robot 11 and points (the welding positions WP11 to WP16) at which the galvanometer scanner 13 performs processing. Further, the action output from the machine learning device 2 (the decision unit 24) includes, for example, a speed command value of each axis of the robot 11 at each time.

Note that the state data, the determination data, and the action output as described above are merely examples and other various data may be also applied. In addition, to determine a target operation (action output), it is not limited that the robot 11 and the galvanometer scanner 13 are actually operated to allow the machine learning device 2 to learn, but for example, it is also possible to allow the machine learning device 2 to learn through a simulation using ROBOGUIDE.

As illustrated in FIG. 2, the state observation unit 21 observes as the state data a state of the tip end of the robot 11 (a position, a speed, and an acceleration of the tip end of the robot) to which the galvanometer scanner 13 is mounted and a state of the optical component in the galvanometer scanner 13 (a position, a speed, and an acceleration of the mirror). The determination data obtaining unit 22 receives as the determination data at least one of the machining time of the robot 11 to which the galvanometer scanner 13 is mounted, the drive current which drives the robot 11, the command path of the galvanometer scanner 13, the passing time in the processable area in which the galvanometer scanner 13 performs processing, and a distance between the robot 11 and the points at which the galvanometer scanner 13 performs processing. The learning unit 23 learns based on an output of the state observation unit 21 and an output of the determination data obtaining unit 22 the operations of the robot 11 and the galvanometer scanner 13.

Herein, the learning unit 23 includes the reward calculation unit 231 and the value function update unit 232. The reward calculation unit 231 calculates a reward based on the output of the state observation unit 21 and the output of the determination data obtaining unit 22, and the value function update unit 232 updates a value function which determines a value of the operations of the robot 11 and the galvanometer scanner 13 based on the output of the state observation unit 21, the output of the determination data obtaining unit 22, and an output of the reward calculation unit 231. Note that although described later in detail with reference to FIG. 5 to FIG. 8, the reward calculation unit 231 may, for example, set a negative reward when the machining time of the robot 11 (the robot system 1) is long and set a positive reward when the machining time of the robot 11 is short.

Further, the reward calculation unit 231 may also, for example, set a negative reward when the command path of the galvanometer scanner 13 is short and set a positive reward when the command path of the galvanometer scanner 13 is long. In addition, the reward calculation unit 231 may also, for example, set a negative reward when the drive current which drives the robot 11 is large and set a positive reward when the drive current which drives the robot 11 is small. Note that such rewards in the reward calculation unit 231 may be set by suitably combining the above plurality of data with each other, and a reward from a plurality of data may be also added. Further, the state data as described above is merely an example and, as described above, other various data may be applied. In addition, the decision unit 24 of the machine learning device 2 determines based on the operations of the robot 11 and the galvanometer scanner 13 as learned by the learning unit 23 the action output to the robot 11 and the galvanometer scanner 13 (the robot system 1).

Incidentally, the machine learning device 2 has functions of analytically extracting, from a set of data as input into the device, a useful rule, a knowledge representation, a criterion for determination or the like contained therein, outputting a result of the determination, and performing knowledge learning (machine learning). Various techniques are available for the machine learning, which are broadly classified into, for example, "supervised learning", "unsupervised learning", and "reinforcement learning". In addition, there is a technique referred to as "deep learning" in which extraction of a feature value per se is learned in order to implement these techniques.

The machine learning device 2 as illustrated in FIG. 2 employs "reinforcement learning (Q-learning)". Although the machine learning device 2 may use a general-purpose computer or a processor, adoption of, for example, general-purpose computing on graphics processing units (GPGPU), large-scale PC clusters or the like allows higher processing. With respect to the whole of machine learning, an outline will be described.

First, in supervised learning, a large quantity of teacher data, i.e., data sets of certain inputs and results (labels) are provided to the machine learning device to learn features in the data sets and inductively obtain a model (error model) for estimating the result from the input, i.e., a relationship thereof. For example, supervised learning may be implemented using an algorithm, such as a neural network as described below.

Unsupervised learning is a technique in which a large quantity of input data alone are provided to the machine learning device to learn how the input data are distributed and the device that performs compression, classification, shaping or the like with respect to the input data performs learning without being provided with corresponding teacher output data. For example, features in the data sets may be clustered into similar features. Using this result, it is possible to achieve prediction of output by allocating outputs such that some criterion is defined to optimize the result.

As intermediate problem setting between unsupervised learning and supervised learning, there is one referred to as semi-supervised learning, which applies to a case, for example, in which there are only some data sets of inputs and outputs and the remaining data are only inputs.

Next, reinforcement learning will be described further in detail. First, a problem setting in reinforcement learning is considered as follows.

A robot system (i.e., the robot 11, the galvanometer scanner 13, and the controller (including, for example, the robot controller and the galvanometer scanner controller (the laser scanner controller)) 12) observes a state of the environment and decides an action.

The environment may change in accordance with some rule, and further, the robot system may change the environment by its own action.

A reward signal returns each time the action is taken.

It is the sum of (discounted) rewards in the future, which is desired to be maximized.

Learning starts in a state in which the result caused by the action is completely not known or only incompletely known. In other words, the robot controller may obtain the result as data only after it actually takes an action. In short, it is preferable to explore the optimum action by trial and error.

By setting a state in which learning (a technique, such as supervised learning as described above or inverse reinforcement learning) is performed in advance to mimic a human behavior as the initial state, learning may be started from a good starting point.

Reinforcement learning is a technique in which, not only by determination or classification but also by learning actions, an appropriate action is learned in consideration of the interaction provided by an action to environment, i.e., how to maximize the reward obtained in the future is learned. Hereinafter, description is continued with an example of Q-learning, but the present invention is not limited to Q-learning.

Q-learning is a method for learning a value Q(s, a) for selecting an action a in a certain environmental state s. In other words, in the certain state s, an action a with the highest value Q(s, a) may be preferably selected as the optimum action. However, at first, the correct value for the value Q(s, a) is completely not known for a pair of the state s and the action a. Accordingly, an agent (action subject) selects various actions a under the certain state s and is given a reward for the action a at that time. Consequently, the agent learns to select a better action, i.e., a correct value Q(s, a).

Further, as a result of the action, it is desired to maximize the sum of the rewards obtained in the future, and it is aimed to finally satisfy $Q(s, a)=E[\Sigma \gamma^t r_t]$. The expected value is assumed to be taken for the case when the state changes following the optimum action, and since it is not known, it is learned by making exploration. An update formula for such a value Q(s, a) may be represented, for example, by equation (1) as follows:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the above equation (1), $s_t$ represents a state of the environment at a time t, and $a_t$ represents an action at the time t. The action $a_t$ changes the state to $s_{t+1}$. $r_{t+1}$ represents a reward that may be gained with the change of the state. Further, the term attached with max is the product of the Q-value multiplied by γ for the case where the action a with the highest Q-value known at that time is selected under the state $s_{t+1}$. γ is a parameter satisfying $0<\gamma\leq 1$, and referred to as a discount rate. α is a learning factor, which is in the area of $0<\alpha\leq 1$.

The above equation (1) represents a method for updating the evaluation value $Q(s_t, a_t)$ of the action $a_t$ in the state $s_t$ based on the reward $r_{t+1}$ returned as a result of the action $a_t$. In other words, it is indicated that when sum of the reward $r_{t+1}$ and the evaluation value $Q(s_{t+1}, \max a_{t+1})$ of the best action max a in the state subsequent to the state s upon the action a is larger than the evaluation value $Q(s_t, a_t)$ of the action a in the state s, $Q(s_t, a_t)$ is increased; otherwise, $Q(s_t, a_t)$ is decreased. In other words, it is configured such that a value of a certain action in a certain state is made to be closer to the reward that is instantly returned as a result and the value of the best action in the subsequent state upon that action.

Methods of representing Q(s, a) on a computer include a method in which values of all state-action pairs (s, a) are held in the form of a table and a method in which a function approximating Q(s, a) is provided. In the latter method, the above equation (1) may be implemented by adjusting parameters of the approximation function using a technique, such as a stochastic gradient descent method. As the approximation function, a neural network described later may be used.

Figure 3:
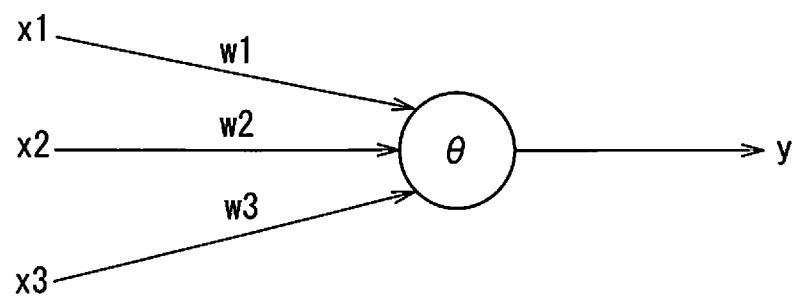
FIG. 3 is a diagram a diagram schematically illustrating a model for a neuron.
Figure 4:
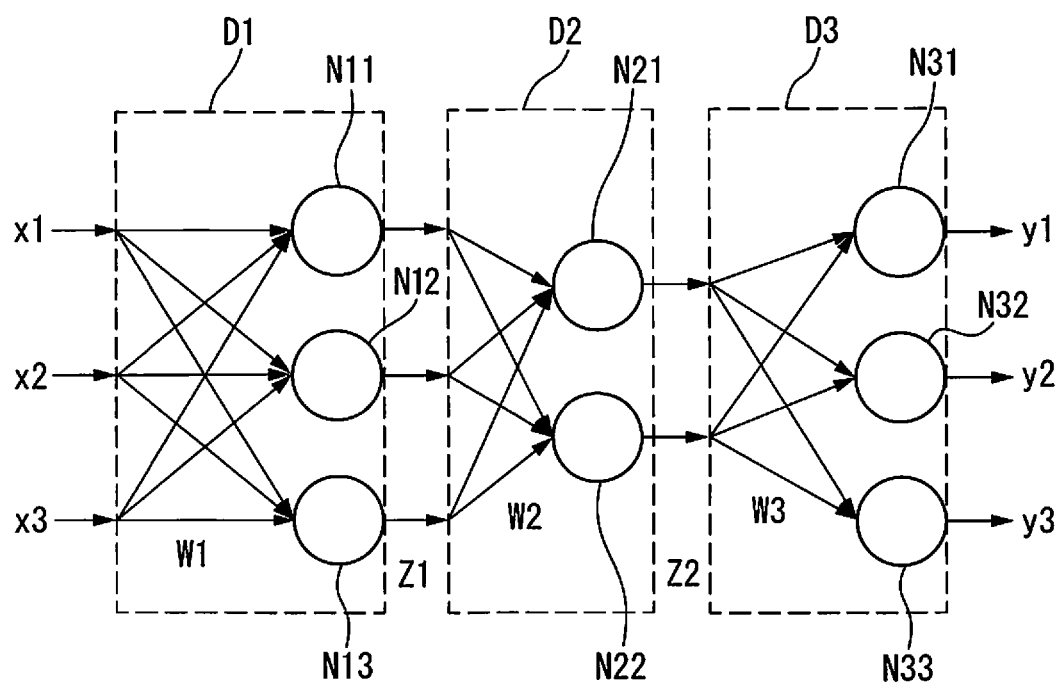
FIG. 4 is a diagram schematically illustrating a three-layer neural network formed by combining the neurons as illustrated in FIG. 3.

As an approximation algorithm for a value function in reinforcement learning, a neural network may also be used. FIG. 3 is a diagram schematically illustrating a model for a neuron, and FIG. 4 is a diagram schematically illustrating a three-layer neural network formed by combining neurons as illustrated in FIG. 3. In other words, the neural network is configured, for example, of an arithmetic device simulating a model for a neuron as illustrated in FIG. 3, a memory, and the like.

As illustrated in FIG. 3, the neuron outputs an output (result) y for a plurality of inputs x (in FIG. 3, by way of example, inputs x1 to x3). Each of the inputs x (x1, x2, x3) is multiplied by a weight w (w1, w2, w3) corresponding to the input x. Thereby, the neuron outputs the result y represented by the following equation (2). Note that all of the input x, the result y, and the weight w are vectors. In the equation (2) below, θ is a bias, and $f_k$ is an activation function.

$$y = f_k(\Sigma_{i=1}^{n} x_i w_i - \theta) \quad (2)$$

Referring to FIG. 4, a description will be given of a three-layer neural network formed by a combination of neurons as illustrated in FIG. 3. As illustrated in FIG. 4, a plurality of inputs x (by way of example herein, inputs x1 to input x3) are input from the left side of the neural network, and a result y (by way of example herein, result y1 to input y3) is output from the right side. Specifically, the inputs x1, x2, and x3 are multiplied by a weight corresponding to each of three neurons N11 to N13 and input. The weights used to multiply these inputs are collectively denoted by W1.

The neurons N11 to N13 output z11 to z13, respectively. In FIG. 4, z11 to z13 are collectively referred to as a feature vector Z1, which may be regarded as a vector which is obtained by extracting feature values of the input vector. The feature vector Z1 is a feature vector defined between the weight W1 and the weight W2. z11 to z13 are multiplied by a weight corresponding to each of the two neurons N21 and N22 and input. The weights used to multiply these feature vectors are collectively denoted by W2.

The neurons N21 and N22 output z21 and z22, respectively. In FIG. 4, z21, z22 are collectively referred to as a feature vector Z2. The feature vector Z2 is a feature vector defined between the weight W2 and the weight W3. z21 and z22 are multiplied by a weight corresponding to each of the three neurons N31 to N33 and input. The weights used to multiply these feature vectors are collectively denoted by W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action of the robot controller is determined using the parameters. Although reference is made to prediction for convenience, it is needless to say that various tasks, such as detection, classification, inference, and the like, are possible.

It is possible that the data obtained by actually operating the robot controller in the prediction mode is immediately learned to be reflected on the subsequent action (on-line learning) and also that a group of pre-collected data is used to perform collective learning and a detection mode is executed with the parameter since then (batch learning). An intermediate case is also possible, where a learning mode is interposed each time data is accumulated to a certain degree.

The weights W1 to W3 may be learned by an error backpropagation method. The error information enters from the right side and flows to the left side. The error back propagation method is a technique for adjusting (leaning) each weight so as to reduce the difference between an output y when an input x is input and a true output y (teacher) for each neuron. Such a neural network may have three or more layers (referred to as deep learning). It is possible to extract features of the input step by step to automatically obtain an arithmetic device, which feeds back the results, from the teacher data alone.

As described with reference to FIG. 2, the machine learning device 2 according to the present example includes the state observation unit 21, the determination data obtaining unit 22, the learning unit 23, and the decision unit 24, for example, to perform Q-learning. Note that the machine learning method applied to the present invention is not limited to Q-learning, and as described above, the machine learning device 2 may be realized by adopting GPGPU, large-scale PC clusters or the like.

Hereinafter, with reference to FIG. 5 to FIG. 8, processing in the machine learning device 2 according to the present embodiment will be described, and the machine learning device 2 according to the present embodiment is to learn and optimize the operations of the robot 11 and the galvanometer scanner (the laser scanner) 13 which operate in a synchronized manner. As described above, learning by the machine learning device 2 may be also performed by moving the actual robot system 1 (a real machine) but may be also performed through a simulation using ROBOGUIDE. Further, learning by the machine learning device 2 according to the present embodiment may be performed, for example, in consideration of optimization of a laser output, and the like.

Figure 5:
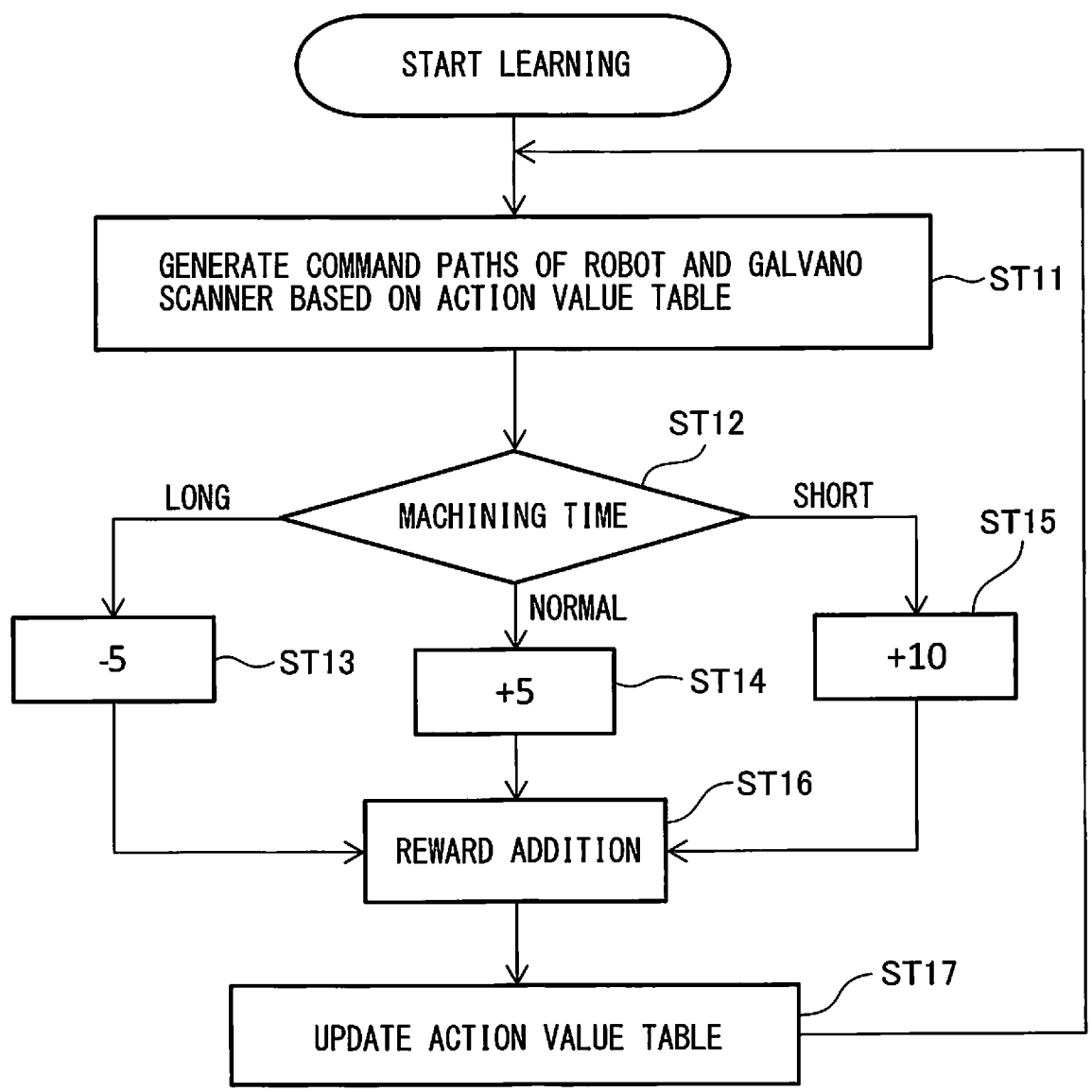
FIG. 5 is a flowchart illustrating a first example of processing in the machine learning device as illustrated in FIG. 2.

FIG. 5 is a flowchart illustrating a first example of the processing in the machine learning device as illustrated in FIG. 2. For example, as an initial condition (an initial value before learning is performed), to satisfy a predetermined processing path, command paths of the robot 11 and the galvanometer scanner 13 are created in advance. Further, the processing path (e.g., the welding line WL in FIG. 11) is determined by a combination of the command paths of the robot 11 and the galvanometer scanner 13. Note that as described above, the operation of the robot 11 has features in which a positioning accuracy and a responsiveness are low but a movable area is large, and the operation of the galvanometer scanner 13 has features in which a positioning accuracy and a responsiveness are high but a movable area is small.

As illustrated in FIG. 5, when machine learning starts (learning starts), at step ST11, based on an action value table, the command paths of the robot 11 and the galvanometer scanner 13 are generated, and the process advances to step ST12. At step ST12, the determination is performed based on the machining time of the robot 11. Note that the machining time indicates, for example, a time of one cycle until predetermined certain welding machining with respect to a machining target (e.g., a vehicle body of an automotive) using a laser beam radiated from the galvanometer scanner 13 mounted on the tip (a tip end portion of an arm) end of the robot 11 is completed.

At step ST12, when the machining time is determined to be long, the process advances to step ST13 and a reward of "−5" is set; when the machining time is determined to be standard, the process advances to step ST14 and a reward of "+5" is set; or when the machining time is determined to be short, the process advances to step ST15 and a reward of "+10" is set. Then, the process advances to step ST16 and rewards are added, in other words, rewards as set at steps ST13 to ST15 are added and the process advances to step ST17. At step ST17, based on the rewards as added, the action value table is updated and again, the process returns to step ST11 and the similar processing is repeated. Thereby, the operations of the robot and the galvanometer scanner may be optimized based on the machining time.

Note that reward values "−5", "+5", and "+10" set at steps ST13 to ST15 are merely an example and it is needless to say that various modifications may be made. In other words, in the example as illustrated in FIG. 5, because the machining time (e.g., a time in which predetermined certain welding machining with respect to a vehicle body of an automotive is performed) is favorably short, for example, a length of the machining time is classified into three: "long", "standard", and "short" to which rewards "−5", "+5", and "+10" are set, respectively, which are, however, merely an example.

Figure 6:
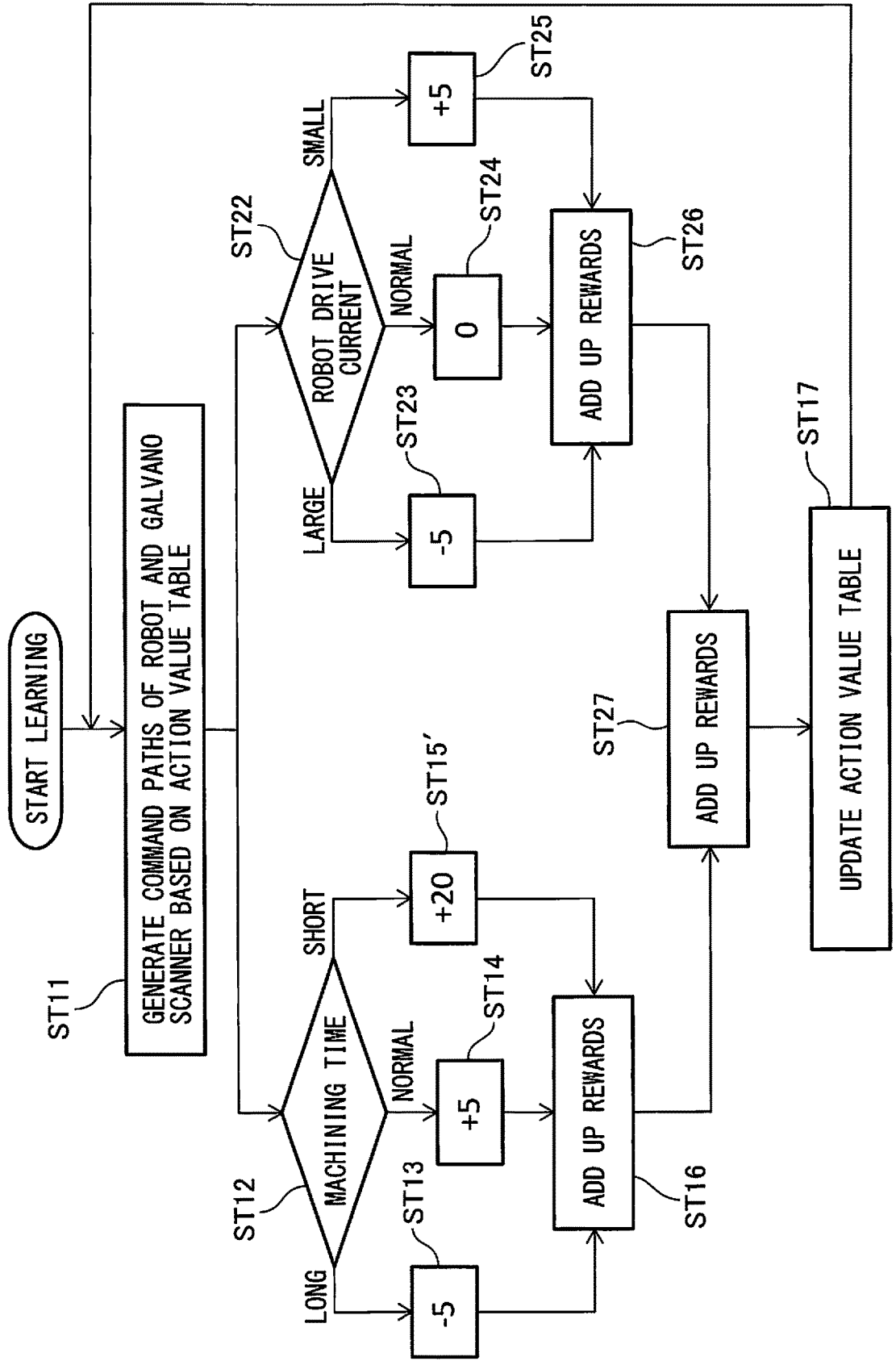
FIG. 6 is a flowchart illustrating a second example of the processing in the machine learning device as illustrated in FIG. 2.

FIG. 6 is a flowchart illustrating a second example of the processing in the machine learning device as illustrated in FIG. 2. As apparent from a comparison between FIG. 6 and FIG. 5 as described above, in the present second example, in addition to the determination based on the machining time in the first example as illustrated in FIG. 5, the determination by the drive current (a robot drive current) which drives the robot 11 is also performed. Note that steps ST11 to ST17 in FIG. 6 correspond to steps ST11 to ST17 in FIG. 5, respectively. Also note that a reward of "+10" set at step S15 in FIG. 5 is replaced at step S15' in FIG. 6 by a reward of "+20".

In other words, as illustrated in FIG. 6, when machine learning starts, at step ST11, based on the action value table, the command paths of the robot 11 and the galvanometer scanner 13 are generated, the process advances to step ST12, and the determination is performed based on the machining time of the robot 11. At step ST12, when the machining time is determined to be long, the process advances to step ST13 and a reward of "−5" is set; when the machining time is determined to be standard, the process advances to step ST14 and a reward of "+5" is set; or when the machining time is determined to be short, the process advances to step ST15' and a reward of "+20" is set.

As described above, in the present second example, when the machining time is determined to be short, at step ST15', a reward of "+20" twice as much as a reward (weight) of "+10" at step ST15 in the first example is set. Then, the process advances to step ST16 and rewards based on the machining time are added, in other words, rewards as set at steps ST13 to ST15' are added.

Further, at step ST11, based on the action value table, the command paths of the robot 11 and the galvanometer scanner 13 are generated, then the process advances to step ST22, and the determination is performed based on the robot drive current. At step ST22, when the robot drive current is determined to be large, the process advances to step ST23 and a reward of "−5" is set; when the robot drive current is determined to be standard, the process advances to step ST24 and a reward of "0" is set; or when the robot drive current is determined to be small, the process advances to step ST25 and a reward of "+5" is set. Further, the process advances to step ST26 and rewards based on the robot drive current are added, in other words, rewards as set at steps ST23 to ST15 are added.

Then, the process advances to step ST27, and addition of an integral value of the rewards based on the machining time at step ST16 and an integral value of the rewards based on the robot drive current at step ST26 is performed. Further, the process advances to step ST17, and based on the rewards as added at step ST27, the action value table is updated and again, the process returns to step ST11 and the similar processing is repeated. Thereby, the operations of the robot and the galvanometer scanner may be optimized based on the machining time and the robot drive current.

Figure 7:
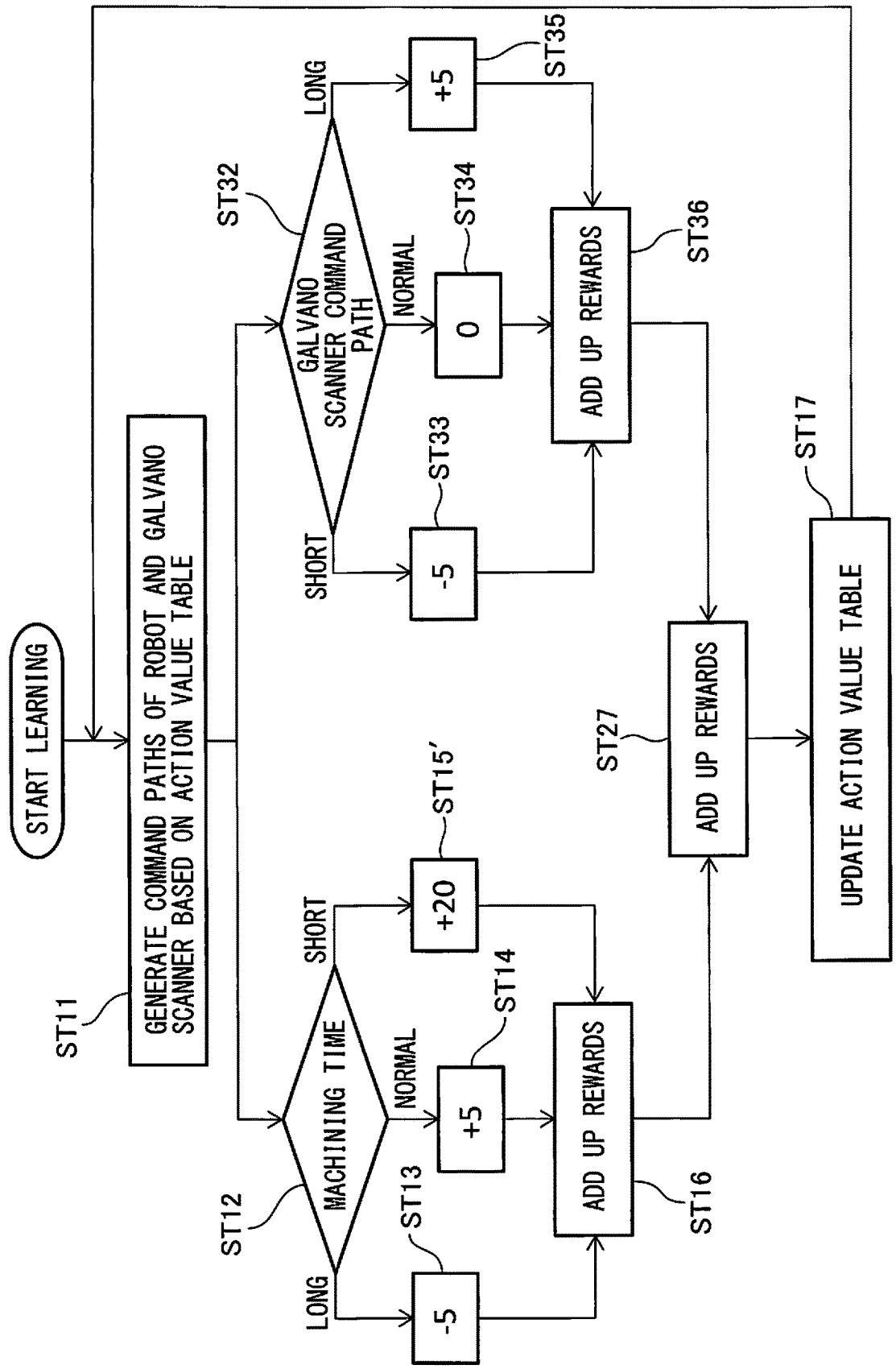
FIG. 7 is a flowchart illustrating a third example of the processing in the machine learning device as illustrated in FIG. 2.

FIG. 7 is a flowchart illustrating a third example of the processing in the machine learning device as illustrated in FIG. 2. As apparent from a comparison between FIG. 7 and FIG. 6 as described above, in the present third example, not the determination based on the robot drive current in the second example as illustrated in FIG. 6, but the determination by the command path of the galvanometer scanner 13 is performed. In other words, in addition to the determination based on the machining time in the first example as illustrated in FIG. 5, the determination by the command path of the galvanometer scanner is also performed. Note that similarly to the second example as illustrated in FIG. 6, a reward of "+10" set at step S15 in FIG. 5 is replaced at step S15' in FIG. 7 by a reward of "+20". In other words, steps ST11 to ST17 in FIG. 7 correspond to steps ST11 to ST17 in FIG. 6, respectively, description of which is omitted.

In the present third example, at step ST11, based on the action value table, the command paths of the robot 11 and the galvanometer scanner 13 are generated, then the process advances to step ST32, and the determination is performed based on the command path of the galvanometer scanner. At step ST32, when the command path of the galvanometer scanner is determined to be short, the process advances to step ST33 and a reward of "−5" is set; when the command path of the galvanometer scanner is determined to be standard, the process advances to step ST34 and a reward of "0" is set; or when the command path of the galvanometer scanner is determined to be long, the process advances to step ST35 and a reward of "+5" is set. Further, the process advances to step ST36 and rewards based on the command path of the galvanometer scanner are added, in other words, rewards as set at steps ST33 to ST35 are added.

Then, the process advances to step ST27, and addition of an integral value of the rewards based on the machining time at step ST16 and an integral value of the rewards based on the command path of the galvanometer scanner at step ST36 is performed. Further, the process advances to step ST17, and based on the rewards as added at step ST27, the action value table is updated and again, the process returns to step ST11 and the similar processing is repeated. Thereby, the operations of the robot and the galvanometer scanner may be optimized based on the machining time and the command path of the galvanometer scanner.

Figure 8:
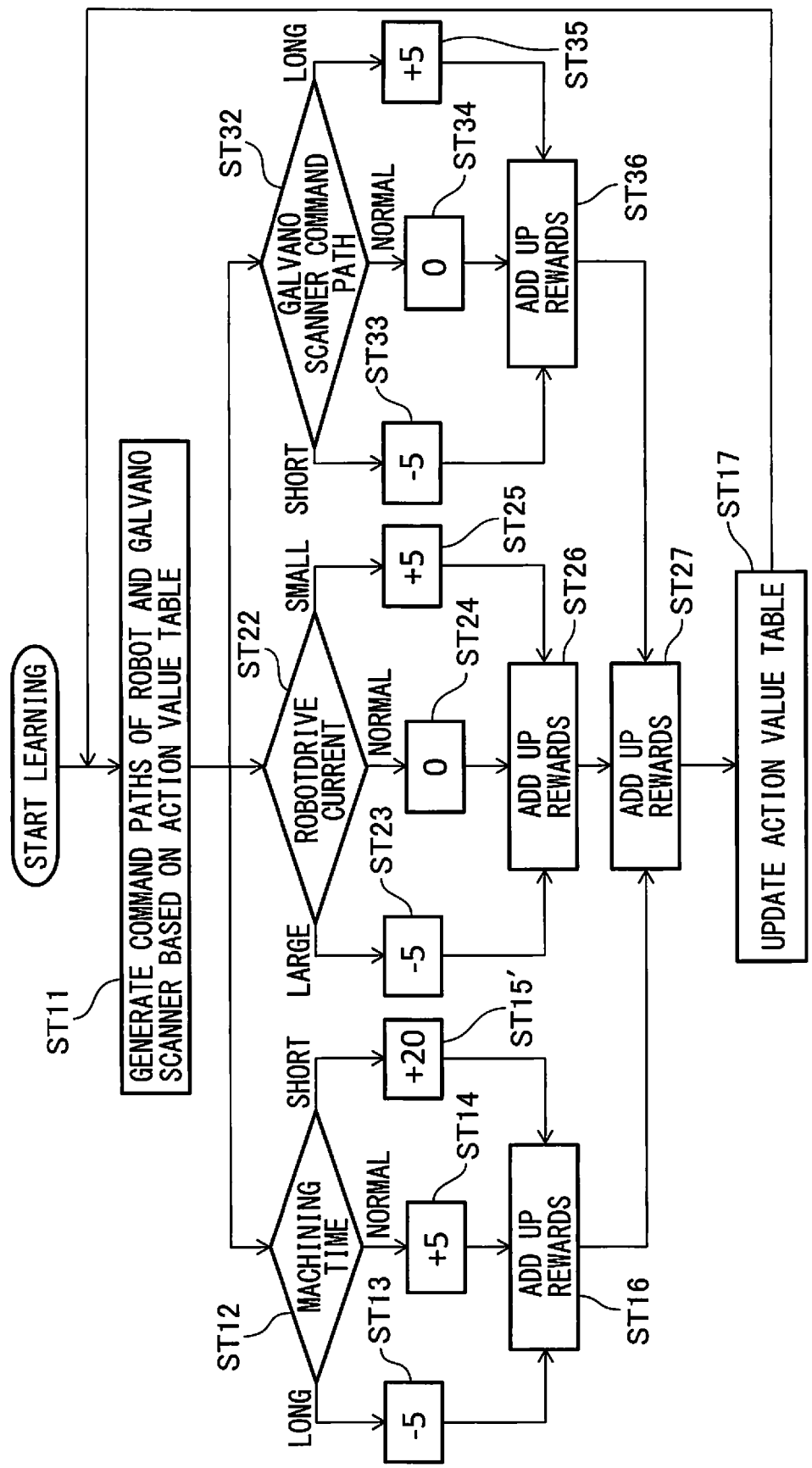
FIG. 8 is a flowchart illustrating a fourth example of the processing in the machine learning device as illustrated in FIG. 2.

FIG. 8 is a flowchart illustrating a fourth example of the processing in the machine learning device as illustrated in FIG. 2. As apparent from a comparison between FIG. 8 and FIG. 6 and FIG. 7 as described above, in the present fourth example, in addition to the determinations based on the machining time and the robot drive current in the second example as illustrated in FIG. 6, the determination by the command path of the galvanometer scanner is also performed. In other words, steps ST11 to ST17 and ST22 to ST27 in FIG. 8 correspond to steps ST11 to ST17 and ST22 to ST27 in FIG. 6, respectively, and steps (ST11 to ST17 and) ST32 to ST36 in FIG. 8 correspond to steps (ST11 to ST17 and) ST32 to ST36 in FIG. 7, respectively.

Note that in the present forth example, at step ST27, addition of an integral value of the rewards based on the machining time at step ST16, an integral value of the rewards based on the robot drive current at step ST26, and an integral value of the rewards based on the command path of the galvanometer scanner at step ST36 is performed. Further, the process advances to step ST17, and based on the rewards as added at step ST27, the action value table is updated and again, the process returns to step ST11 and the similar processing is repeated. Thereby, the operations of the robot and the galvanometer scanner may be optimized based on the machining time, the robot drive current, and the command path of the galvanometer scanner.

Figure 9:
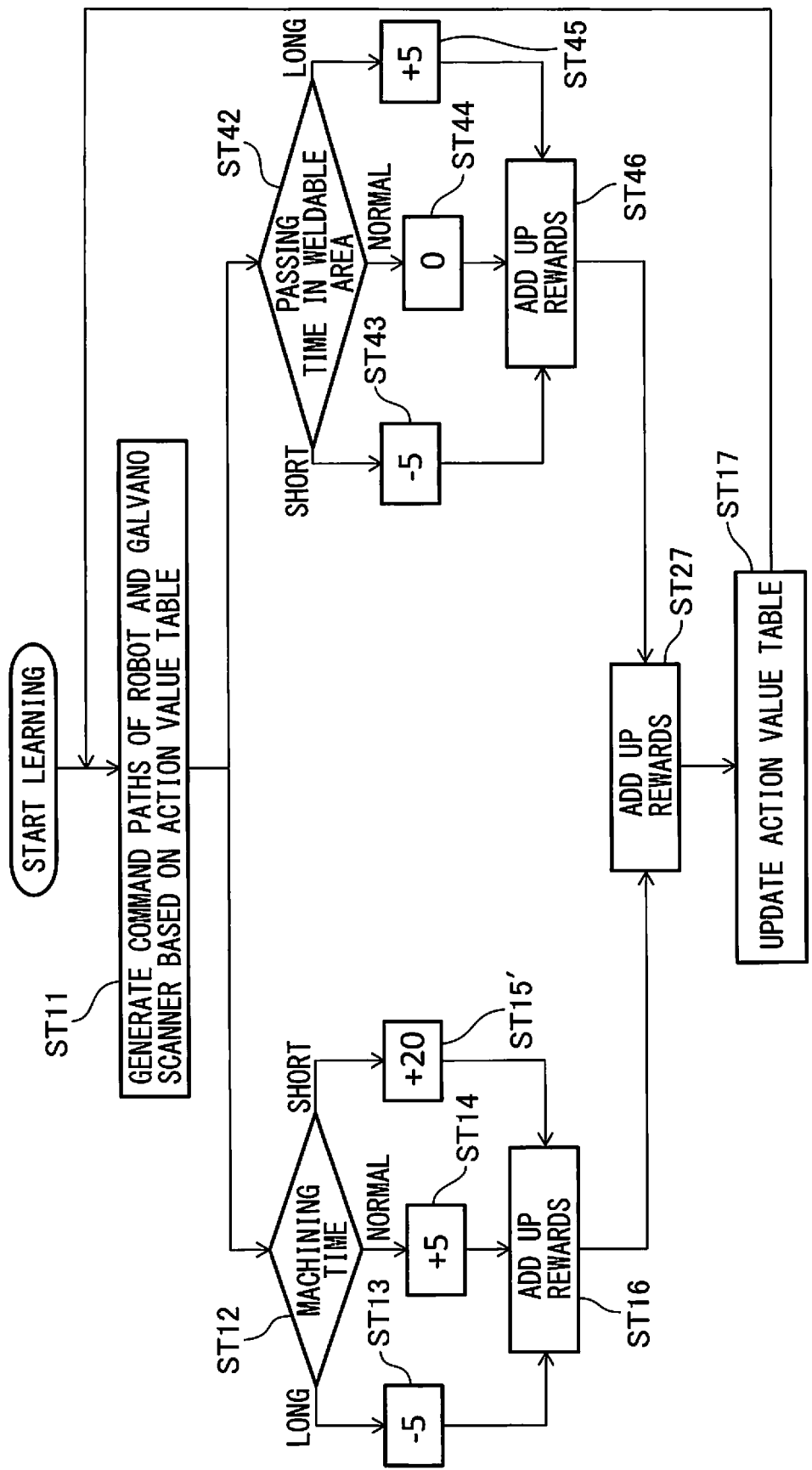
FIG. 9 is a flowchart illustrating a fifth example of the processing in the machine learning device as illustrated in FIG. 2.

FIG. 9 is a flowchart illustrating a fifth example of the processing in the machine learning device as illustrated in FIG. 2. As apparent from a comparison between FIG. 9 and FIG. 7 as described above, in the present fifth example, not the determination based on the command path of the galvanometer scanner in the third example as illustrated in FIG. 7 but the determination by the passing time in the processable (weldable) area in which the galvanometer scanner 13 performs processing (welding) is performed. In other words, because when the passing time in the weldable area in which the galvanometer scanner 13 performs welding (the in-territory time in the weldable areas WA11 to WA16: see FIG. 13B) is long, welding processing by the galvanometer scanner 13 may be performed with a time, it is configured that the determination based on the passing time in the weldable area is performed. Note that steps ST11 to ST14, ST15', ST16, ST17, and ST27 in FIG. 9 are similar to those in FIG. 7, description of which is thus omitted.

In the present fifth example, at step ST11, based on the action value table, the command paths of the robot 11 and the galvanometer scanner 13 are generated, then the process advances to step ST42, and the determination is performed based on the passing time in the weldable area. At step ST42, when the passing time in the weldable area is determined to be short, in other words, when it is determined that welding processing by the galvanometer scanner 13 may not be performed with a time, the process advances to step ST43 and a reward of "−5" is set or when the passing time in the weldable area is determined to be standard, the process advances to step ST44 and a reward of "0" is set. Alternatively, at step ST42, when the passing time in the weldable area is determined to be long, in other words, when it is determined that welding processing by the galvanometer scanner 13 may be performed with a time, the process advances to step ST45 and a reward of "+5" is set. Further, the process advances to step ST46 and rewards based on the passing time in the weldable area are added, in other words, rewards as set at steps ST43 to ST45 are added.

Then, the process advances to step ST27, and addition of an integral value of the rewards based on the machining time at step ST16 and an integral value of the rewards based on the passing time in the weldable area at step ST46 is performed. Further, the process advances to step ST17, and based on the rewards as added at step ST27, the action value table is updated and again, the process returns to step ST11 and the similar processing is repeated. Thereby, the operations of the robot and the galvanometer scanner may be optimized based on the machining time and the passing time in the weldable area.

Figure 10:
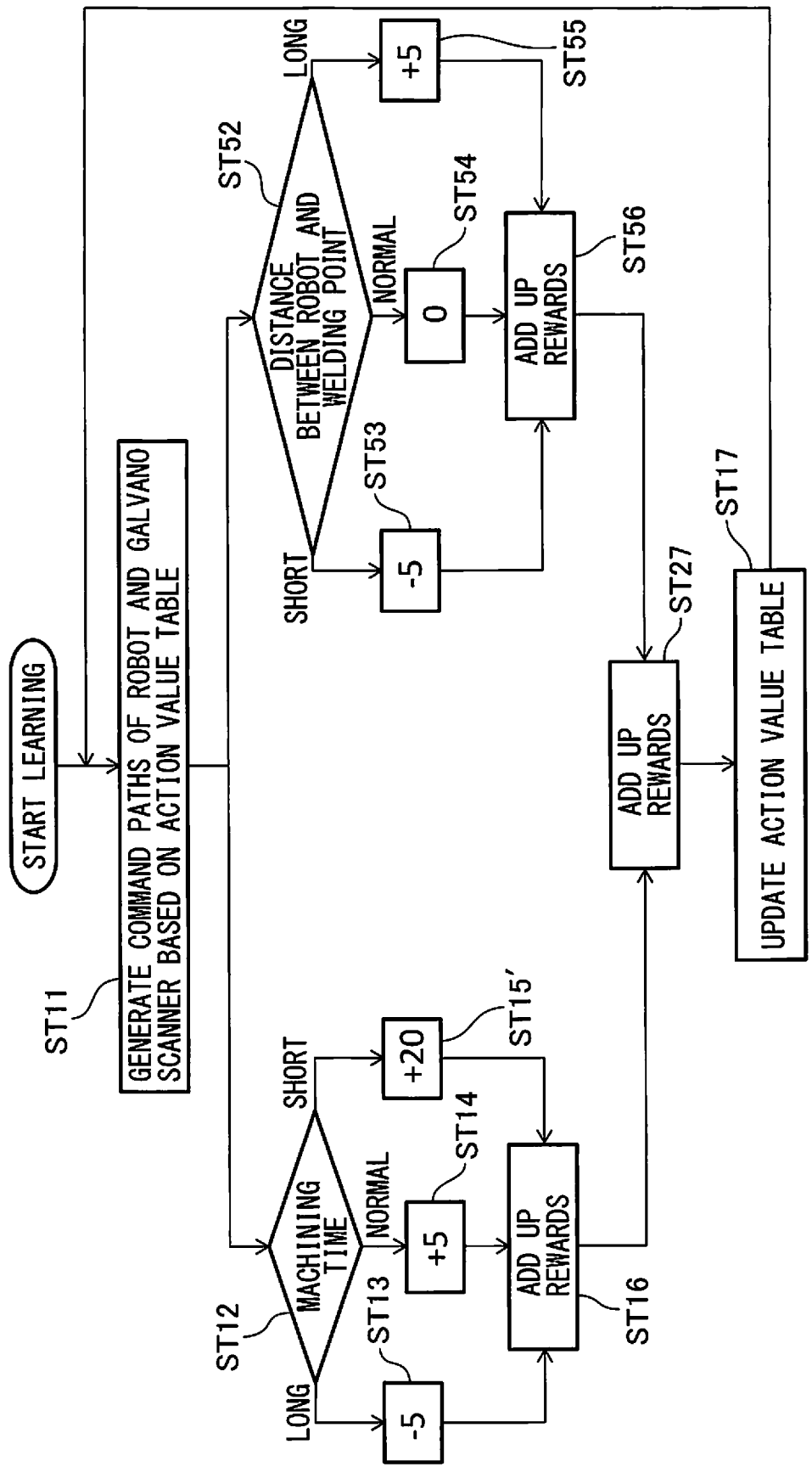
FIG. 10 is a flowchart illustrating a sixth example of the processing in the machine learning device as illustrated in FIG. 2.

FIG. 10 is a flowchart illustrating a sixth example of the processing in the machine learning device as illustrated in FIG. 2. As apparent from a comparison between FIG. 10 and FIG. 7 as described above, in the present sixth example, not the determination based on the command path of the galvanometer scanner in the third example as illustrated in FIG. 7 but the determination by the distance between the robot 11 and the points at which the galvanometer scanner 13 performs processing, i.e., the distance between the robot 11 (the robot system 1) and the welding positions WP11 to WP16 is performed. It is configured that the determination based on the distance between the robot and the welding points is performed because when the distance between the robot and the welding points is short, for example, a laser beam from the galvanometer scanner 13 may be radiated vertically onto the welding positions WP11 to WP16, which is favorable or when the distance between the robot and the welding points is long, for example, a laser beam from the galvanometer scanner 13 is radiated obliquely onto the welding positions so that the quality of welding may lower than that when irradiation is vertically performed. Note that steps ST11 to ST14, ST15', ST16, ST17, and ST27 in FIG. 9 are similar to those in FIG. 7 (FIG. 9), description of which is thus omitted.

In the present sixth example, at step ST11, based on the action value table, the command paths of the robot 11 and the galvanometer scanner 13 are generated, then the process advances to step ST52, and the determination is performed based on the distance between the robot and the welding points. At step ST52, when the distance between the robot and the welding points is determined to be long in other words, when it is determined that a laser beam from the galvanometer scanner 13 may be radiated obliquely onto the welding positions, the process advances to step ST53 and a reward of "−5" is set or when the distance between the robot and the welding points is determined to be standard, the process advances to step ST54 and a reward of "0" is set. Alternatively, at step ST52, when the distance between the robot and the welding points is determined to be short, in other words, when it is determined that a laser beam from the galvanometer scanner 13 may be radiated substantially vertically onto the welding positions, the process advances to step ST55 and a reward of "+5" is set. Further, the process advances to step ST56 and rewards based on the distance between the robot and the welding points are added, in other words, rewards as set at steps ST53 to ST55 are added.

Then, the process advances to step ST27, and addition of an integral value of the rewards based on the machining time at step ST16 and an integral value of the rewards based on the distance between the robot and the welding points at step ST56 is performed. Further, the process advances to step ST17, and based on the rewards as added at step ST27, the action value table is updated and again, the process returns to step ST11 and the similar processing is repeated. Thereby, the operations of the robot and the galvanometer scanner may be optimized based on the machining time and the distance between the robot and the welding points.

Hereinbefore, the determination data for setting a reward in the reward calculation unit 231 is not to be limited to the machining time, the robot drive current, the command path of the galvanometer scanner (the laser scanner), the passing time in the processable area in which the galvanometer scanner performs processing, and the distance between the robot and the points at which the galvanometer scanner performs processing as described above, but such determination conditions may be optionally combined with each other. Further, the robot system of the present invention is applied to a remote laser welding robot system which performs laser welding in a non-limitative manner and may be applied to robot systems which perform various operations, such as laser cutting, laser hole piercing, metal machining, laser resin welding, resin machining, surface machining, and surface modification. Further, the galvanometer scanner is not limited to that which scans a laser beam in two dimensions in the XY direction, but, for example, may be that which scans in three dimensions, and further, a type of a laser beam used may be various one, such as fiber laser, carbon dioxide laser, and YAG laser. Then, the present invention is applied to the galvanometer scanner according to the examples as described above in a non-limitative manner and, as described above, may be widely applied to a laser scanner in general, such as a trepanning head and a polygon scanner.

The machine learning device, the robot system, and the machine learning method of the present invention produce effects that operations of a robot and a laser scanner may be optimized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning operations of a robot and a laser scanner, the machine learning device comprising a processor configured to:
    acquire state data of a tip end of the robot to which the laser scanner is mounted and state data of an optical component in the laser scanner,
    receive a plurality of determination data comprising
        a machining time of the robot to which the laser scanner is mounted,
        a passing time in a processable area in which the laser scanner performs processing,
        at least one of a drive current to drive the robot, and a command path of the laser scanner, and
        a distance between the robot and a part at which the laser scanner performs processing, and
    learn operations of the robot and the laser scanner based on the state data and the determination data,
    wherein the processor is further configured to:
        calculate a reward based on the state data and the determination data, by
            calculating a first value as a first reward value given to a first one of the plurality of determination data,
            calculating a second value as a second reward value given to a second one of the plurality of determination data, and
            adding the first reward value to the second reward value to obtain the reward, and
        update a value function that determines a value of the operations of the robot and the laser scanner based on the state data, the determination data, and the reward.

2. The machine learning device according to claim 1, wherein
    the processor is configured to acquire the state data of the tip end of the robot, including a position, a speed, and an acceleration of the tip end of the robot to which the laser scanner is mounted.

3. The machine learning device according to claim 1, wherein
    the processor is configured to acquire the state data of the optical component in the laser scanner, including a position, a speed, and an acceleration of the optical component in the laser scanner.

4. The machine learning device according to claim 1, wherein
    the processor is further configured to determine an action output to the robot and the laser scanner based on the operations of the robot and the laser scanner as learned by the processor.

5. The machine learning device according to claim 1, wherein
    the processor is configured to
        set a negative or a positive reward based on the machining time of the robot.

6. The machine learning device according to claim 1, wherein
    the processor is configured to
        set the reward as a negative or a positive reward based on the command path of the laser scanner, or
        set the reward as a negative or a positive reward based on the drive current which drives the robot.

7. The machine learning device according to claim 1, wherein
    the processor is configured to
        set the reward as a negative or a positive reward based on the passing time in the processable area in which the laser scanner performs processing, or
        set the reward as a negative or a positive reward based on the distance between the robot and the part at which the laser scanner performs processing.

8. The machine learning device according to claim 1, wherein
    the machine learning device includes a neural network.

9. The machine learning device according to claim 1, wherein
    the machine learning device is provided to each robot, configured to be connectable to at least one other machine learning device, and to mutually exchange or share a result of machine learning with the at least one other machine learning device.

10. The machine learning device according to claim 1, wherein
    the machine learning device is located in a cloud server or a fog server.

11. A robot system, comprising:
    a robot,
    a robot controller configured to control the robot,
    a laser scanner,
    a laser scanner controller configured to control the laser scanner, and
    a machine learning device, comprising a processor configured to:
        acquire state data of a tip end of the robot to which the laser scanner is mounted and state data of an optical component in the laser scanner,
        receive a plurality of determination data comprising
            a machining time of the robot which the laser scanner is mounted,
            a passing time in a processable area in which the laser scanner performs processing, at least one of a drive current to drive the robot, and a command path of the laser scanner, and a distance between the robot and a part at which the laser scanner performs processing, and learn operations of the robot and the laser scanner based on the state data and the determination data, wherein the processor is further configured to:

calculate a reward based on the state data and the determination data, by calculating a first value as a first reward value given to a first one of the plurality of determination data, calculating a second value as a second reward value given to a second one of the plurality of determination data, and adding the first reward value to the second reward value to obtain the reward, and update a value function that determines a value of the operations of the robot and the laser scanner based on the state data, the determination data, and the reward.

12. The robot system according to claim 11, wherein the robot is a remote laser welding robot configured to perform welding using a laser beam radiated from the laser scanner.

13. A machine learning method for learning operations of a robot and a laser scanner, the method comprising:

acquiring state data of a tip end of the robot to which the laser scanner is mounted and state data of an optical component in the laser scanner;

receiving a plurality of determination data comprising a machining time of the robot to which the laser scanner is mounted, a passing time in a processable area in which the laser scanner performs processing, at least one of a drive current to drive the robot, and a command path of the laser scanner, and a distance between the robot and a part at which the laser scanner performs processing; and learning operations of the robot and the laser scanner based on the state data as acquired and the determination data as obtained, calculating a reward based on the state data and the determination data, by calculating a first value as a first reward value given to a first one of the plurality of determination data, calculating a second value as a second reward value given to a second one of the plurality of determination data, and adding the first reward value to the second reward value to obtain the reward, and updating a value function that determines a value of the operations of the robot and the laser scanner based on the state data, the determination data, and the reward.

* * * * *